United States Patent Office 3,743,594
Patented July 3, 1973

3,743,594
HYDRODESULFURIZATION OF NAPHTHA WITH A GROUP VIII METAL COMPONENT COMBINED WITH SYNTHETIC LAYERED CRYSTALLINE ALUMINOSILICATE
Barnard F. Mulaskey, Fairfax, Calif., assignor to Chevron Research Company, San Francisco, Calif.
Filed May 14, 1971, Ser. No. 143,504
Int. Cl. C10g 23/02, 23/04
U.S. Cl. 208—216                                    12 Claims

ABSTRACT OF THE DISCLOSURE

A process for desulfurization of naphtha which comprises contacting the naphtha in the presence of hydrogen gas with a catalyst comprising a Group VIII metal component and a layered crystalline aluminosilicate. Preferably, the catalyst Group VIII metal is palladium and the desulfurization is preferably carried out at a relatively low temperature between 300° and 550° F.

The naphtha desulfurization catalyst used has been found to be superior to desulfurization catalysts, containing three dimensional crystalline aluminosilicate molecular sieves.

BACKGROUND OF THE INVENTION

The present invention relates to dsulfurization of hydrocarbons. More particularly, the present invention relates to the desulfurization of light hydrocarbon feeds using a catalyst containing a Group VIII metal.

Desulfurization of sulfur-containing light hydrocarbon feeds to most isomerization processes and to catalytic reforming processes is important.

A number of desulfurization catalysts are disclosed in "The Hydrodesulfurization of Liquid Petroleum Fractions" by Joseph B. McKinley, Chapter 6, page 405, of Catalysis, vol. V (Reinhold, N.Y. 1957). A common method of desulfurizing a hydrocarbon feedstock involves contacting the feedstock, in the presence of hydrogen and at comparatively high temperatures, with a catalyst such as cobalt-molybdenum on a refractory support. In the desulfurization process, organic sulfur compounds contained in the feedstock are hydrogenated to form sulfur-free organic compounds and $H_2S$. Once the $H_2S$ is formed, it can be separated from the sulfur free compounds by various means.

Desulfurization catalysts such as supported cobalt-molybdenum, or supported nickel, are disclosed in a large number of U.S. patents including, for example, Nos. 2,516,876; 2,746,907; 2,866,751; 2,913,405; 2,914,468; 2,951,032; and 3,081,258.

U.S. Pat. 3,542,672 is directed to desulfurization at a temperature between 392° and 572° F., preferably between 482° and 536° F., using hydrogen and steam and a catalyst containing palladium and sodium on an alumina support. Other exemplary patents disclosing desulfurization using a noble metal include U.S. Pat. 2,965,564, platinum eta-alumina used at temperatures between 500° and 675° F.; U.S. Pat. 2,918,427, presulfided platinum on alumina used at a temperature between 340° and 940° F. with a minimum sulfur to hydrogen ratio; U.S. Pat. 2,916,443, platinum on alumina used at a temperature above 500° F.; and U.S. Pat. 2,885,352, platinum or palladium on alumina used at a temperature between 500° and 850° F.

U.S. Pat. 3,527,695 is directed to aromatic hydrogenation using a catalyst consisting of palladium on three-dimensional crystalline aluminosilicate. Examples of suitable three-dimensional aluminosilicates, according to U.S. Pat. 3,527,695, include zeolite Y, mordenite, and zeolite X. According to U.S. Pat. 3,527,695, the aromatics hydrogenation is carried out in the presence of 0.1 per 1,000 parts per million of sulfur at a temperature between 194° and 752° F. Simultaneous desulfurization can occur with the aromatic hydrogenation according to U.S. Pat. 3,527,695, but there are desirably no other reactions (e.g., no isomerization or hydrocracking).

None of the references mentioned above disclose the use of layered crystalline aluminosilicate, particularly synthetic layered crystalline aluminosilicate, in a naphtha desulfurization catalyst.

U.S. Pat. 3,252,757 and U.S. Pat. 3,252,889 contain general disclosures of synthetic layered crystalline aluminosilicates. These latter two patents also mention the use of layered crystalline aluminosilicates in catalytic cracking catalysts.

SUMMARY OF THE INVENTION

According to the present invention, a process is provided for naphtha desulfurization, which process comprises contacting the naphtha in the presence of hydrogen gas with a catalyst comprising a Group VIII metal component and a synthetic layered crystalline aluminosilicate. Preferably, the catalyst Group VIII metal is palladium or platinum and the desulfurization is preferably carried out at a relatively low temperature between 300° and 550° F.

Particularly preferred Group VIII metal for the catalyst is palladium.

The present invention, among other factors, is based on my finding of unexpectedly high desulfurization ability for layered crystalline aluminosilicate, particularly synthetic layered crystalline aluminosilicate, plus Group VIII metals. I have especially found that palladium on layered crystalline alumininosilicate has a high desulfurization activity. Also, I have found that a very high percent desulfurization can be obtained for naphtha feedstocks using catalysts such as palladium on layered crystalline aluminosilicate at relatively low temperatures, for example temperatures of the order of 400° F., versus prior art temperatures of about 650° F. used for cobalt-molybdenum catalyzed desulfurization. Thus, the catalyst used in the naphtha desulfurization process according to the present invention is particularly desirable for use ahead of low temperature isomerization; for example, isomerization carried out at temperatures below about 400° F.

Also, although it would be expected that a layered crystalline aluminosilicate catalyst would be most likely less active than a three-dimensional crystalline aluminosilicate catalyst, I have found that just the opposite result is obtained in my naphtha desulfurization process. This is further supported by FIG. 3 discussed hereinbelow.

Certain terms commonly used can be explained further for purposes of the present invention. The term "layered crystalline aluminosilicate" is used herein to refer to synthetic layered crystalline aluminosilicates and to acid-activated layered crystalline aluminosilicates. Thus, the term does not include natural clays that have not been acid-activated. Natural clays or natural layered crystalline aluminosilicate material is usually alkaline due to the presence of alkali material such as sodium. Synthetic clays are prepared in an acid-active form. In the process of the present invention synthetic clays are particularly preferred for the desulfurization catalyst.

The term "naphtha" is used herein to refer to light hydrocarbons, particularly hydrocarbons boiling between about 50° and 450° F. Preferably the naphtha feed to the process of the present invention boils between about 80° and 200° F. Also, in the process of the present invention, although various naphtha feeds can be desulfurized, I have found that the process of the present invention is particularly advantageously applied to straight run naphtha; that is, naphtha which has not been subjected to previous catalytic processing such as catalytic cracking.

The term "desulfurization" is used herein to refer to the changing of organic sulfur compounds to organic compounds free of sulfur and $H_2S$ by hydrogenation of organic sulfur compounds. The hydrogenation of the organic sulfur compounds, or cracking off of sulfur and forming $H_2S$, is achieved in part due to the presence of free hydrogen gas in the desulfurization reaction zone.

Preferably, the free hydrogen gas is obtained by hydrogen which is added to the reaction zone, that is, fed to the reaction zone in addition to the naphtha feed. Although the hydrogen can be obtained by other means as, for example, by "auto-fining," it is preferred to add hydrogen, particularly since the process of the present invention is preferably run at relatively mild conditions.

The process of the present invention can be carried out with some concomitant isomerization and hydrocracking, but the present invention is directed particularly to naphtha desulfurization, and one of the unexpected advantages of the process of the present invention is that the naphtha desulfurization can be carried out successfully at mild conditions without substantial concomitant isomerization or hydrocracking.

Use of the terms "metal" or "palladium" or "chromium" or the like herein means that the metal element is present in a given catalyst, but does not exclude compounds of the metal element such as oxides or sulfides, i.e., the metal element can be present as a compound.

Pressure used in naphtha desulfurization process of the present invention can be between 50 and 5,000 p.s.i.g. in the reaction zone, but 100 to 1,000 p.s.i.g. is preferred.

As indicated above, one of the outstanding advantages of the process of the present invention is that the desulfurization can be carried out at a relatively low temperature. Temperatures between 250° and 900° F. can be employed, but lower temperatures are preferred. Most preferably, the process is carried out at a temperature between 350° and 450° F. Other preferred relatively low temperature operating ranges are 250° to 650° F. and 300° to 550° F. Although the relatively low temperatures are usually the most preferred, the somewhat higher temperatures included in the last two mentioned ranges are advantageously used in certain instances, for example when it is desirable to process the naphtha at a relatively high space velocity through the reaction zone containing the catalyst. In other words, the relatively high activity of the catalyst allows the use of relatively small amounts of the catalyst and correspondingly small reactors, or allows the use of a lower temperature.

Preferred amounts of the Group VIII components (calculated as the metal element) are between 0.05 and 10.0 weight percent. When using the more expensive and preferred platinum and palladium, preferred amounts are between 0.05 and 5.0 percent. Particularly preferred amounts of palladium are between 0.2 and 2.0 weight percent.

Catalysts which I have found are particularly outstanding for naphtha desulfurization in accordance with the process of the present invention include those catalysts to which Ser. No. 839,999, now U.S. Pat. 3,617,490, is directed as, for example, catalysts comprising palladium and preferably chromium on a synthetic layered crystallined aluminosilicate. Preferred amounts of chromium for the catalyst in the desulfurization process of the present invention are between 0.1 and 5.0 weight percent. The disclosure of Ser. No. 839,999 is incorporated by reference into the present patent application. Ser. No. 21,152, now U.S. Pat. 3,655,798, also is directed to layered crystalline aluminosilicate catalysts which I have found are particularly good naphtha desulfurization catalysts in accordance with the process of the present invention. The disclosure of Ser. No. 21,152 is incorporated by reference into the present application.

Particularly preferred layered crystalline clay-type aluminosilicates for use in the catalyst used in the present invention include the synthetic hydrated layered crystalline clay-type aluminosilicate of Granquist (U.S. Pat. 3,252,757) and the dehydrated form of Capell and Granquist (U.S. Pat. 3,252,889).

The light hydrocarbon feedstocks processed in accordance with the present invention typically do not contain high quantities of organic sulfur material. Preferred sulfur content for the naphtha treated in accordance with the process of the present invention is 1500 parts per million or less, and usually it is preferred to treat feeds containing less than 1000 parts per million of sulfur. Particularly preferred maximum sulfur content for the naphtha feed, that is, organic sulfur compound content calculated as sulfur, is 200 parts per million.

One of the outstanding advantages of the process of the present invention is that the sulfur content can be reduced to very low levels, for example, less than five parts per million sulfur, and frequently less than one part per million sulfur in the desulfurized product.

Figure 1:
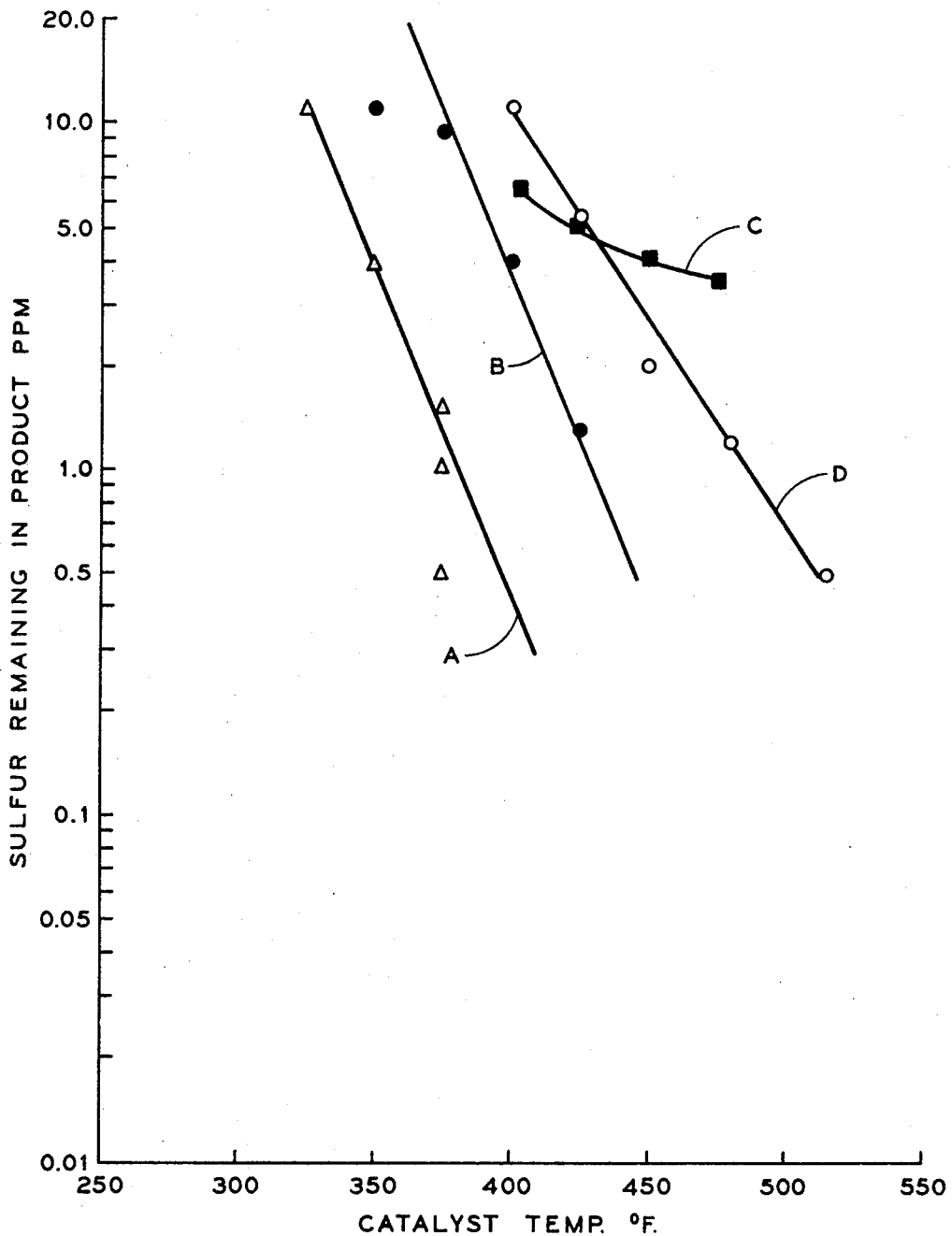
FIG. 1 is a comparison of a catalyst in accordance with the present invention to other catalysts. Desulfurization reaction temperature is plotted versus product sulfur level. The sulfur content of the feed was 137 parts per million.

FURTHER DESCRIPTION OF THE DRAWINGS AND THE INVENTION (1) Data were obtained for the FIG. 1 plots from desulfurization runs at 285 p.s.i.g., using 2000–3500 standard cubic feet of hydrogen per barrel of naphtha feed. The naphtha feed was passed over the respective catalysts in the respective runs at a liquid hourly space velocity (LHSV) of two. The naptha feed was obtained from the bottom of a distillation column distilling very light hydrocarbons overhead with light naphtha hydrocarbons being withdrawn from the bottom of the distillation column.

The analysis of the naphtha feed by gas chromatograph was as follows:

TABLE I

| Naphtha feed compound: | Wt. percent |
|---|---|
| $iC_5$ | 49.184 |
| $nC_5$ | 35.576 |
| 2,2DMB | 0.128 |
| Cyclo-$C_5$ | 2.041 |
| 2,3DMB | 0.788 |
| 2MP | 3.663 |
| 3MP | 1.935 |
| $nC_6$ | 2.411 |
| MCP | 3.102 |
| $C_6+$ | 1.172 |

The composition of the catalyst used in the respective runs, A through D, is as shown in Table II below.

TABLE II. — COMPOSITION OF CATALYSTS TESTED FOR DESULFURIZATION OF LIGHT NAPHTHA

A—0.5% palladium, 0.5% chromium on synthetic layered crystalline aluminosilicate
B—0.5% palladium on NH$_4$Y sieve (the palladium on Y zeolite catalyst was obtained from Linde. The Y sieve is a three-dimensional crystalline aluminoslicate.)
C—9% Ni, 5% Sn, remainder SiO$_2$
D—50% nickel-tin silica, mixed with 50% by weight synthetic layered crystalline aluminosilicate The data which are presented graphically in FIG. 1, particularly curve A, illustrate the unexpected results found in accordance with the present invention. Use of catalysts in accordance with the present invention gave superior results for naphtha desulfurization compared to other catalysts, specifically including palladium on three-dimensional crystalline aluminosilicate.

The data plotted for Catalyst D compared to that for Catalyst C show that incorporation of synthetic clay into a relatively poor nickel-tin-silica desulfurization catalyst (Catalyst C) both improves activity and changes the catalyst response to temperatures.

Figure 2:
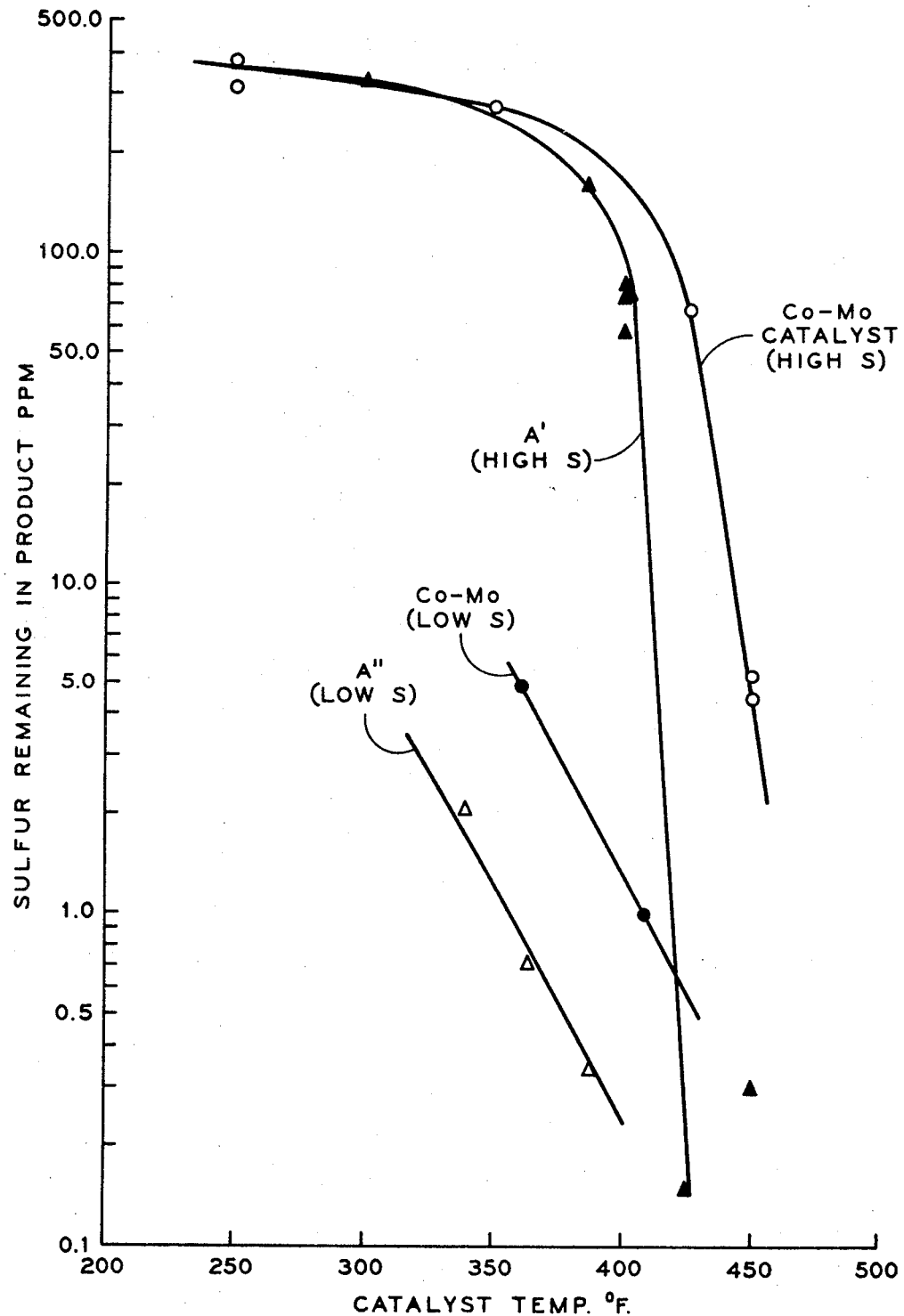
FIG. 2 is a comparison of the catalyst of the present invention to cobalt-molybdenum catalyst. The desulfurization reaction temperature is plotted versus product sulfur. The FIG. 2 graph data were obtained at high (1500) p.p.m. sulfur in the feed, and also at low (137) p.p.m. sulfur in the feed.

(2) The data for FIG. 2 were obtained under the following process conditions:

Naphtha feed: as in Table I (except the feed was spiked with organic sulfur compounds so that the sulfur content of the feed was 1500 parts per million).
Pressure: 300 p.s.i.g.
H$_2$ addition rate: ~12,000 s'c.f./bbl. feed.
LHSV: 2.0.

As llustrated by the respective curves for the data obtained using a cobalt-molybdenum catalyst and the data obtained using Catalyst A (Catalyst A is a catalyst in accordance with the present invention), even at the high sulfur levels the catalyst in accordance with the present invention gave a somewhat better desulfurization activity than the cobalt-molybdenum catalyst did. At the low sulfur levels the catalyst in accordance with the present invention gave an even greater improvement relative to the cobalt-molybdenum desulfurization catalyst.

Figure 3:
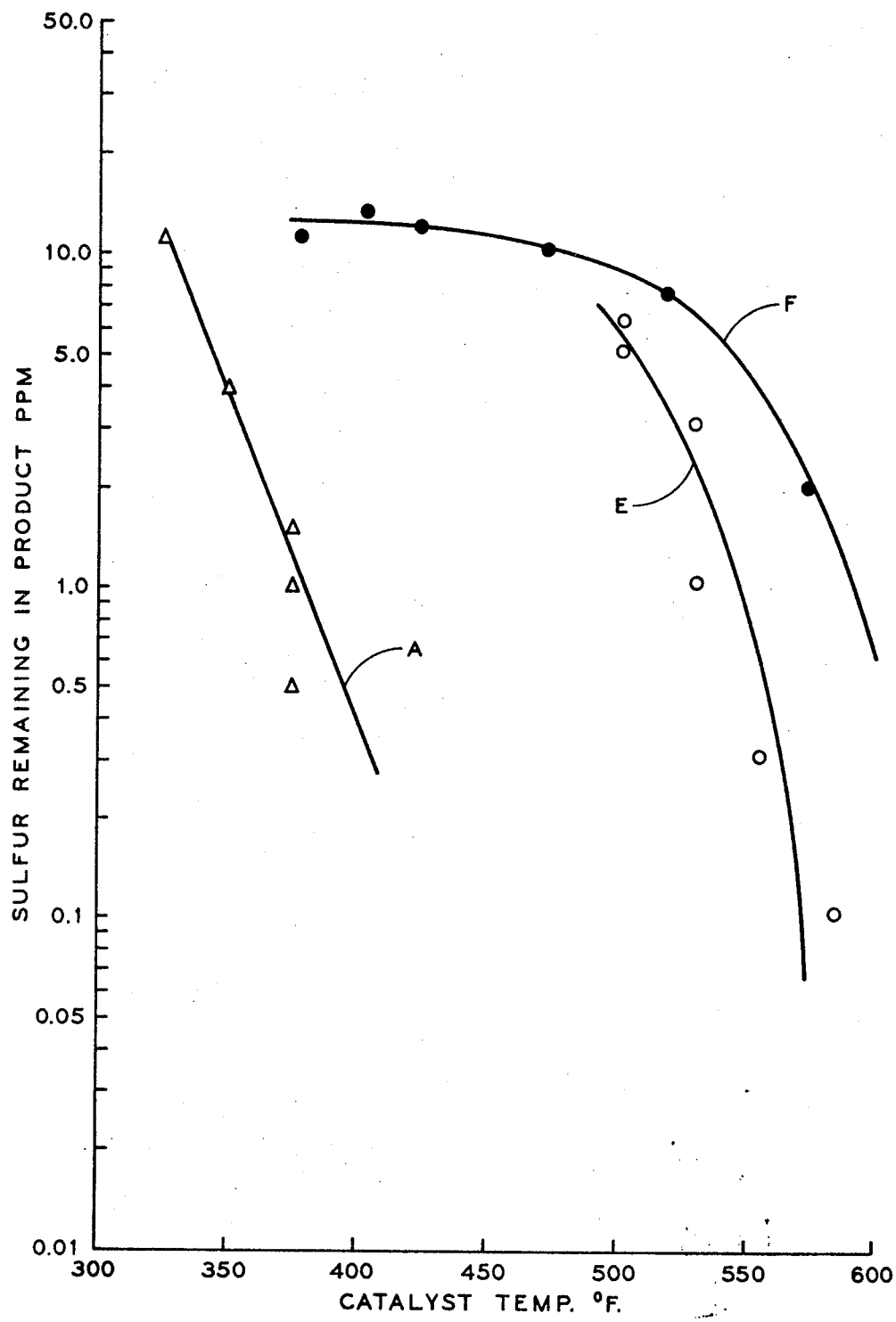
FIG. 3 is a comparison of catalyst in accordance with the present invention containing the layered crystalline aluminosilicate to a catalyst containing a three-dimensional crystalline aluminosilicate. The sulfur level of the feed was 140 parts per million.

(3) The data in FIG. 3 contract the catalyst of the present invention with the data for (1) the hydrodesulfurization catalyst disclosed in U.S. Pat. 3,527,695, and (2) a second catalyst consisting of a Group VIII metal component on three-dimensional crystalline aluminosilicate. The U.S. Pat. 3,527,695 catalyst consisted of palladium on a three-dimensional crystalline aluminosilicate support containing 0.94 weight percent sodium. The three-dimensional crystalline aluminosilicate was zeolite Y. The catalyst is described in more detail in Example 1 of U.S. Pat. 3,527,695.

Desulfurization data for the catalyst of U.S. Pat. 3,527,695 are shown in curve E. Data for another Group VIII metal on three-dimensional crystalline aluminoslicate are shown in curve F. The curve F catalyst was 0.5 weight percent palladium on mordenite. The run conditions to obtain the respective curves A, E and F shown in FIG. 3 were as follows:

For curve A:

LHSV—2.0.
Pressure—285 p.s.i.g.
Hydrogen rate—2640 s.c.f./bbl. of oil feed.
Feed sulfur content—137 parts per million.

For curve E:

LHSV—4.0.
Pressure—350 p.s.i.g. of hydrogen.
Hydrogen-to-hydrocarbon rate—2.5.
Feed sulfur content—140 parts per million.

For Curve F:

LHSV—2.0.
Pressure—300 p.s.i.g. of hydrogen.
Hydrogen rate—12,000 s.c.f./bbl. feed.
Feed sulfur content—137 parts per million.

As can be seen from FIG. 3, the catalyst of the present invention performed substantially better than similar catalysts containing three-dimensional crystalline aluminosilicate instead of layered crystalline aluminosilicate.

The layered crystalline aluminosilicate components used in the catalyst of the present invention may be of various types of catalytically active synthetic or acid-washed natural clays. The term "clay" is used herein to mean layered crystalline aluminosilicates with mica-like layers. The particular synthetic layered crystalline aluminosilicate material used in the examples was obtained from the Baroid Company.

A preferred synthetic hydrated layered aluminosilicate for use in the process of the present invention, referred to in U.S. Pat. 3,252,757, incorporated herein by reference thereto, has the empirical formula

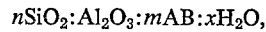

$$nSiO_2 : Al_2O_3 : mAB : xH_2O,$$

where the layer lattices comprise said silica, said alumina, and said B, and wherein $n$ is from 2.4 to 3.0
$m$ is from 0.2 to 0.6
A is one equivalent of an exchangeable cation having a valence not greater than 2, and is external to the lattice,
B is chosen from the group of negative ions which consists of F$^-$, OH$^-$, ½O$^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. The equivalent of an exchangeable cation, A, in said mineral may be chosen from the group consisting of H$^+$, NH$_4^+$, Li$^+$, K$^+$, ½Ca$^{++}$, ½Mg$^{++}$, ½Sr$^{++}$, and ½Ba$^{++}$, and mixtures thereof.

A preferred dehydrated synthetic layered aluminosilicate for use in the process of the present invention, referred to in U.S. Pat. 3,252,889, incorporated herein by reference thereto, has the empirical formula:

$$2.4 \text{ to } 3.0 SiO_2 : Al_2O_3 : 0.2 \text{ to } 0.6 AB$$

wherein the layer lattices comprise silica (SiO$_2$), alumina (Al$_2$O$_3$) and B; and wherein A is one equivalent of an exchangeable cation selected from the group consisting of hydrogen, alkali metal, and alkaline earth metal ions, and mixtures thereof, and
B is one equivalent of an anion selected from the group consisting of fluoride, hydroxyl, and oxygen ions, and mixtures thereof;

said crystalline material being further characterized by a $d_{001}$ spacing ranging from 9.6 to 10.2 angstrom units determined at 50% relative humidity, and being predominantly ordered in two dimensions. The dehydrated layered aluminosilicate of 3,252,889 is obtained from the hydrated layered aluminosilicate of U.S. Pat. 3,252,757 by calcination at a temperature within the range of 600° to 1450° F., preferably 600° to 1200° F. Upon calcination of the hydrated form, and removal of water, the $d_{001}$ spacing of the aluminosilicate collapses somewhat, resulting in a layered aluminosilicate of a smaller $d_{001}$ spacing. According to the teachings of U.S. Pat. 3,252,889, the collapse is irreversible and the dehydrated layered aluminosilicate is no longer capable of swelling—apparently the removal of water from the hydrated form results in a new and different chemical and indeed mineralogical species from the starting material.

The layered aluminosilicates are to be distinguished from the crystalline zeolitic molecular sieve components which have well-ordered and uniform pore structures as a result of the crystalline structures having bonds that are substantially equally strong in three dimensions. Such crystalline zeolitic aluminosilicates as, for example, zeolite X referred to in U.S. Pat. 2,882,244 and zeolite Y referred to in U.S. Pat. 3,130,007 are found to be too acidic to be useful in reforming. Thus, the crystalline zeolitic molecular sieves result in excessive hydrocracking of the hydrocarbon naphtha feed components.

Generally when the layered aluminosilicate is in a sodium form, it is preferred for the process of the present invention that the sodium ions be replaced with other ions lower in the electromotive series than sodium. The sodium ion concentration on the layered aluminosilicate should preferably be less than about 1 weight percent. Thus, the layered aluminosilicate may contain, in place of the sodium, ions such as, e.g., calcium, magnesium, strontium, barium, rare earth metal ions, Groups IV through VIII metal ions, etc. It is particularly preferred that the layered aluminosilicate exist substantially in the ammonium or hydrogen form. Also, it is preferred that the layered aluminosilicate be maintained substantially free of any catalytic loading metal or metals. When a sodium form of the layered aluminosilicate is one of the starting materials, it may be converted to the ammonium or hydrogen form by ion exchange prior to being combined with the Group VIII component. Alternately, it may be combined with the Group VIII component and then converted to the ammonium or hydrogen form by ion exchange.

Although various embodiments of the invention have been described, it is to be understood that they are meant to be illustrative only and not limiting. Certain features may be changed without departing from the spirit or scope of the present invention. It is apparent that the present invention has broad application to the desulfurizing of hydrocarbon feedstocks, particularly naphtha feedstocks, using a catalyst comprising a Group VIII component on a clay support, most preferably palladium or platinum on a synthetic layered crystalline aluminosilicate. Accordingly, the invention is not to be construed as limited to the specific embodiments or examples discussed but only as defined in the appended claims or substantial equivalents of the claims.

What is claimed is:

1. A process for hydrodesulfurization of naphtha containing organic sulfur compounds, said process comprising contacting said naphtha at a temperature between 250 and 900° F. and a pressure between 50 p.s.i.g. and 5,000 p.s.i.g with hydrogen and with a catalyst comprising a Group VIII metal component combined with a synthetic layered crystalline aluminosilicate, said layered crystalline aluminosilicate having the empirical formula:

$$nSiO_2:Al_2O_3:mAB:xH_2O$$

where the layer lattices comprise said silica, said alumina, and said B, and where $n$ is from 2.4 to 3.0,
  $m$ is from 0.2 to 0.6,
  A is one equivalent of an exchangeable cation, selected from the group consisting of hydrogen, alkali metal, and alkaline earth metal ions, and mixtures thereof; and is external to the lattice,
  B is chosen from the group of negative ions which consists of $F^-$, $OH^-$, $\frac{1}{2}O^{--}$ and mixtures thereof, and is internal in the lattice, and
  $x$ is from 2.0 to 3.5 at 50% relative humidity,
said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations, and recovering a naphtha product of reduced organic sulfur content.

2. A process for hydrodesulfurization of naphtha containing organic sulfur compounds, said process comprising contacting said naphtha at a temperature between 250 and 900° F. and a pressure between 50 p.s.i.g. and 5,000 p.s.i.g. with hydrogen and with a catalyst comprising a Group VIII metal component combined with a synthetic layered crystalline aluminosilicate, said layered crystalline aluminosilicate having the empirical formula:

$$2.4 \text{ to } 3.0 SiO_2:Al_2O_3:0.2 \text{ to } 0.6 AB$$

wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and
  B is one equivalent of an anion selected from the group consisting of fluoride, hydroxyl, and oxygen ions, and mixtures thereof;

said crystalline material being further characterized by $d_{001}$ spacing ranging from 9.6 to 10.2 angstrom units determined at 50% relative humidity and being predominantly ordered in two dimensions, and recovering a naphtha product of reduced organic sulfur content.

3. A process in accordance with claim 1 wherein the Group VIII metal is platinum or palladium.

4. A process in accordance with claim 1 wherein the Group VIII metal is palladium.

5. A process in accordance with claim 1 wherein the desulfurization is carried out at a temperature between 300° and 550° F.

6. A process in accordance with claim 1 wherein the amount of Group VIII metal is 0.05 to 10.0 percent of the catalyst weight.

7. A process in accordance with claim 1 wherein the organic sulfur content of the feed naphtha is less than 1500 p.p.m. calculated as sulfur by weight.

8. A process in accordance with claim 3 wherein the amount of platinum or palladium is 0.05 to 5.0 percent of the catalyst weight.

9. A process in accordance with claim 4 wherein the organic sulfur content of the feed naphtha is less than 200 p.p.m. calculated as sulfur by weight.

10. A process in accordance with claim 3 wherein the catalyst also contains 1.0 to 5.0 weight percent chromium.

11. A process in accordance with claim 2 wherein the catalyst also contains 0.1 to 5.0 weight percent chromium.

12. A process in accordance with claim 11 wherein the Group VIII metal is platinum or palladium.

References Cited

UNITED STATES PATENTS

| | | | |
|---|---|---|---|
| 3,535,272 | 10/1970 | Kittrell et al. | 208—111 |
| 3,632,501 | 1/1972 | Kittrell | 208—111 |
| 3,617,490 | 11/1971 | Csicsery | 208—111 |
| 3,632,500 | 1/1972 | Csicsery et al. | 208—111 |

DELBERT E. GANTZ, Primary Examiner

G. J. CRASANAKIS, Assistant Examiner

U.S. Cl. X.R.

208—217

UNITED STATES PATENT OFFICE
CERTIFICATE OF CORRECTION

Patent No. 3,743,594　　　　　　　　Dated　July 3, 1973

Inventor(s)　Bernard F. Mulaskey

It is certified that error appears in the above-identified patent and that said Letters Patent are hereby corrected as shown below:

Col. 5, line 45, "contract" should read --contrast--.

Claim 10, line 1, "Claim 3" should read --Claim 4--.

Claim 12, line 1, "Claim 11" should read --Claim 2--.

Signed and sealed this 9th day of April 1974.

(SEAL)
Attest:

EDWARD M. FLETCHER, JR.　　　　　　　　C. MARSHALL DANN
Attesting Officer　　　　　　　　　　　　Commissioner of Patents